(12) United States Patent
Darling

(10) Patent No.: US 8,916,301 B2
(45) Date of Patent: Dec. 23, 2014

(54) FUEL CELL REACTANT INLET HUMIDIFICATION

(75) Inventor: Robert M. Darling, South Windsor, CT (US)

(73) Assignee: Ballard Power Systems Inc., Burnaby (CA)

( * ) Notice: Subject to any disclaimer, the term of this patent is extended or adjusted under 35 U.S.C. 154(b) by 373 days.

(21) Appl. No.: 13/261,390

(22) PCT Filed: Mar. 1, 2010

(86) PCT No.: PCT/US2010/000618
§ 371 (c)(1),
(2), (4) Date: Jul. 30, 2012

(87) PCT Pub. No.: WO2011/109004
PCT Pub. Date: Sep. 9, 2011

(65) Prior Publication Data
US 2012/0315556 A1 Dec. 13, 2012

(51) Int. Cl.
*H01M 8/06* (2006.01)
*H01M 8/10* (2006.01)
*H01M 8/24* (2006.01)
*H01M 8/02* (2006.01)
*H01M 8/04* (2006.01)

(52) U.S. Cl.
CPC .......... *H01M 8/0258* (2013.01); *H01M 8/0267* (2013.01); *H01M 8/04134* (2013.01); *H01M 2008/1095* (2013.01); *Y02E 60/50* (2013.01)
USPC .............................. 429/413; 429/480; 429/457

(58) Field of Classification Search
None
See application file for complete search history.

(56) References Cited

U.S. PATENT DOCUMENTS

| | | | |
|---|---|---|---|
| 6,551,736 B1 * | 4/2003 | Barbir et al. ............... | 429/480 |
| 2003/0077501 A1 * | 4/2003 | Knights et al. ............... | 429/38 |
| 2005/0008921 A1 | 1/2005 | Johnson | |
| 2007/0148526 A1 * | 6/2007 | Farrington et al. ........... | 429/38 |
| 2007/0224474 A1 * | 9/2007 | Yang et al. ................... | 429/25 |
| 2009/0011310 A1 * | 1/2009 | Trabold et al. ............... | 429/30 |
| 2009/0208803 A1 * | 8/2009 | Farrington ................... | 429/30 |

FOREIGN PATENT DOCUMENTS

JP 06-188010 A 7/1994

OTHER PUBLICATIONS

International Search Report mailed Mar. 1, 2010, for International Application No. PCT/US2010/000618, 3 pages.

* cited by examiner

*Primary Examiner* — Ula C Ruddock
*Assistant Examiner* — Matthew Van Oudenaren
(74) *Attorney, Agent, or Firm* — Seed IP Law Group PLLC

(57) ABSTRACT

In a proton exchange membrane fuel cell power plant (9) in which each of the fuel cells (11) employ reactant gas flow field channels (51) extending inwardly from a first surface of a conductive, water permeable reactant gas flow field plate (50), for at least one of the reactants of the fuel cell, a region (63) of the reactant gas flow field channels is substantially shallower than the remaining portion (60) of the flow field channels (51) thereby decreasing resistance to gas phase mass transfer from the wetted walls of the flow field plate to the gas in the region (63), the resulting increase in thickness of the web (58) adjacent the region (63) reduces the resistance to liquid water transport from the first coolant channel (52) to the inlet edge (55) of the plate (50) so that the plate supports a higher evaporation rate into the reactant gas in the shallow region (63).

10 Claims, 1 Drawing Sheet

FUEL CELL REACTANT INLET HUMIDIFICATION

TECHNICAL

This invention relates to enhancing humidification of fuel cell reactant channels by causing a short length of said channels near their inlets to be more shallow than normal, thereby decreasing resistance to gas phase mass transfer of moisture from wetted walls of porous, hydrophilic reactant gas flow field plates in which the channels are formed.

BACKGROUND ART

A very important characteristic of fuel cell power plants is the reliable lifetime of the fuel cell stack itself. In fuel cell stacks employing proton exchange membranes, the end of useful life is usually related to failure of the membrane. Membrane failure adjacent to the air inlet has been determined to be a specific problem which is not uncommon. Dryness of the membrane within the active area promotes membrane failure.

Humidification of reactant gases at the inlet of the gases to the reactant gas flow field channels has been achieved heretofore by humidifying a gas prior to entry into the fuel cell stack. However, the use of external humidification increases the amount of hardware required to accompany the fuel cell stack, which may be impermissible in mobile applications of fuel cells. Humidification has been achieved also by rendering a portion of the fuel cell planform inoperative near the inlets, so that the area will be inactive, and the fuel cell process will not involve a dry membrane. On the other hand, rendering a portion of a fuel cell inactive near a reactant inlet reduces the power density of the fuel cell stack.

Improved humidification of fuel and oxidant gases also usually improves cell performance and extends membrane life.

SUMMARY

It is advantageous to increase the relative humidity of fuel cell reactants at the inlet edge of the active area of the fuel cell, without either reducing the active area of the cells, nor requiring external humidification mechanisms and modalities.

Reactant gas channels in conductive, water permeable reactant gas flow field plates are caused to be shallow in regions of the channels between the reactant gas inlets and the active areas of PEM fuel cells. The shallower portion may be substantially coextensive with edge seals, which are outside the active area of the cells. Reactant gas channels that are shallower at the inlet region decreases the resistance to gas phase mass flow, that is, transfer of moisture, from wetted walls of hydrophilic, porous water transport plates to the gas in the channels. The shallower reactant gas channels result in thicker webs, which are defined herein as the regions of the water transport plate which are underneath or otherwise adjacent to the shallow portion of the reactant gas channels, which results in an increase in the rate of evaporation of water into the reactant gas entering the fuel cell.

As an example only, in an illustrative fuel cell power plant, the normal reactant gas channel depth is 0.635 mm (0.025 inches, or 25 mils) and the web is 0.51 mm (20 mils), with a likely relative humidity at the end of the edge seal (at the beginning of the fuel cell active area) of at least about 48% at rated power. The concomitant permeability required to support evaporation for 48% relative humidity is about $3.5 \times 10^{-15}$ m$^2$. Reducing the channel depth under the edge seal, according hereto, to 0.4 mm (15 mils) and increasing the web thickness to 0.745 mm (30 mils) could increase the relative humidity at the entrance to the active area, with maximum air flow, to about 57%, with the same permeability.

Other variations will become more apparent in the light of the following detailed description of exemplary embodiments, as illustrated in the accompanying drawings.

MODE(S) OF IMPLEMENTATION

Figure 1:
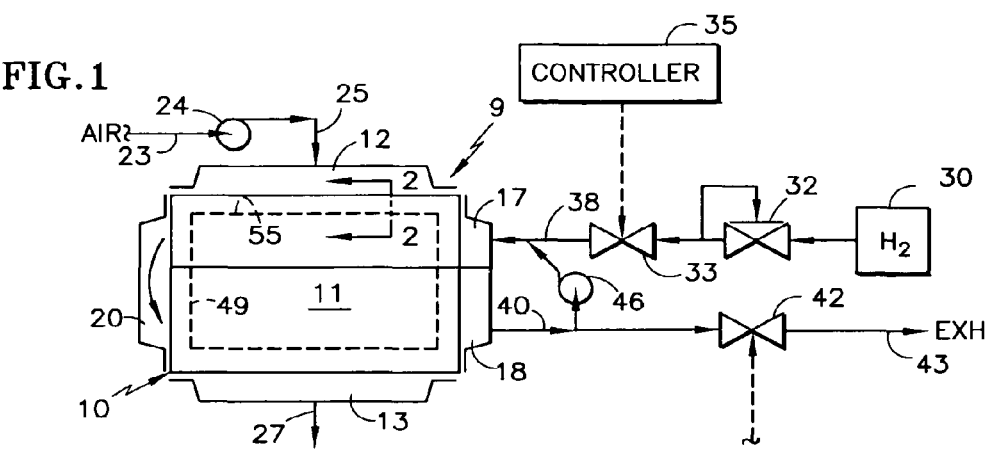
FIG. 1 is a simplified schematic illustration of a portion of a fuel cell power plant.

Referring to FIG. 1, a fuel cell power plant 9 includes a stack 10 of fuel cells 11 having air inlet and exit manifolds 12, 13, fuel inlet and exit manifolds 17, 18 as well as a fuel turn manifold 20. In the example of FIG. 1, oxidant reactant gas is in the form of air provided by an air inlet 23 to an oxidant pump 24 which is connected by a conduit 25 to the air inlet manifold 12. The exhaust of the air flow fields in the fuel cells 11 is provided to an outlet 27 of the air exit manifold 13.

Fuel is provided from a source 30, which may be pressurized hydrogen or reformate gas from a hydrocarbon fuel processor. Usually, the fuel pressure is controlled by a remote sensing pressure relief valve 32, and the amount of fuel to be processed is controlled by a valve 33 in response to a controller 35. The fuel is provided through a conduit 38 to the fuel inlet manifold 17 where it thereafter flows to the left through an upper portion (as seen in FIG. 1) of all the fuel cells within the stack 10, thence turning around in the turn manifold 20 and flowing to the right through a lower portion of all of the fuel cells, to the fuel exit manifold 18. The exiting fuel is provided through a conduit 40 to a purge valve 42 which releases suitable amounts of contaminated fuel recycle gas to exhaust 43. The conduit 40 also connects the fuel outlet manifolds 18 to a fuel recycle pump 46 which provides recycle fuel to the fuel inlet manifold 17.

The fuel cells 10 include edge seals 48 (FIG. 2) illustrated by a dashed line 49 in FIG. 1.

Figure 2:
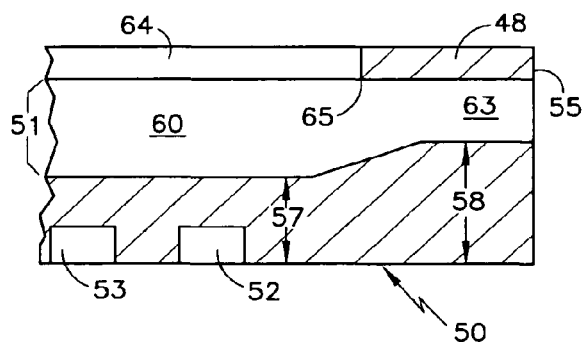
FIG. 2 is a partial section taken on the lines 2-2 of FIG. 1 illustrating reactant gas flow field channels which are shallow at a point upstream of the active area of the fuel cell.
Figure 3:
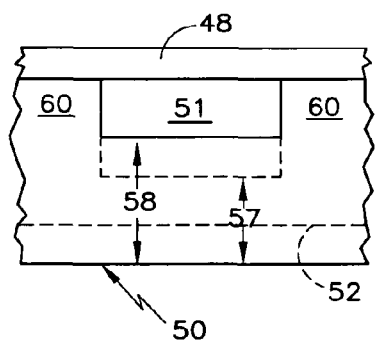
FIG. 3 is a partial end view of the fuel cell reactant gas flow field plate of FIG. 2.

Referring to FIG. 2, the oxidant gas reactant flow field plate 50 of each of the fuel cells 11 is a conductive plate, highly permeable to water, having air flow channels 51 and coolant water flow channels 52, 53 extending inwardly from opposite surfaces and mutually exclusive edges thereof, the air channels flow being perpendicular to the coolant channels 52, 53. The inlet end 55 of each of the air flow channels 51 opens directly into the air inlet manifolds 12 (FIG. 1). When coolant water (or humidification water) is available in the water channels 52, the water transport plate 50 is saturated with water everywhere, including the web portions 57, 58 below (as seen in FIG. 2) the surface of the flow channels 51, and the ribbed portions 60 between the air flow channels 51.

Figure 4:
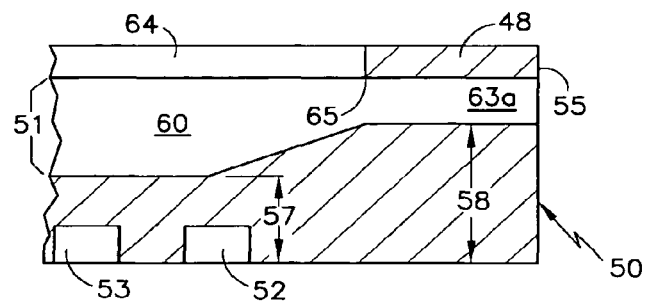
FIG. 4 is a partial section of an alternative to FIG. 2.

To increase the humidification of the air entering the air flow channels 51, the inlet end of the air channels upstream of the active areas of the cells, roughly the equivalent to the width of the edge seal 48, has a reduced depth, and a concomitant increase in the depth of the web 58 of each of the channels 51. The reduced depth portion 63 of the air flow channels 51 extends upstream of the active area of the fuel cell, which is at the intersection 65 of the edge seal 48 with a gas diffusion layer 64. Although shown as being not fully coextensive with the edge seal 48 in FIG. 2, the reduced depth region 63a may extend to the full extent of the edge seal 48 as illustrated in FIG. 4. If desired, the reduced depth portion 63 of the air flow channels 51 may extend a short distance into the active area of the fuel cell (that area being illustrated by the position of the gas diffusion layer 64 in FIGS. 2 and 4).

Reducing the depth of the channel in the region 63 decreases the distance of a portion of the incoming air to the web 58 which decreases resistance to gas phase (water vapor) mass transfer from the wetted water transport plate 50 to the gas in the portion 63 of the air flow channel 51. Furthermore, because the web 58 is thicker, the resistance to liquid water transport from the closest coolant channel 52 to the edge of the plate is reduced, enabling the plate to support a higher evaporation rate.

An exemplary water transport plate 50 has a depth of the air flow channels 51 throughout their length of 0.635 mm (25 mils), which is about 55% of the thickness of the plate 51, with a web thickness of 0.51 mm (20 mils). The likely relative humidity of the air flowing near the end 65 of the edge seals 48 is about 48% at high power. The permeability required to support the evaporation rate commensurate with that relative humidity is about $3.5 \times 10^{-15}$ m$^2$.

Herein, reducing the channel depth under the edge seal to 0.4 mm (15 mils), which is about 35% of the plate thickness, while maintaining the same thickness of the water transport plate 50 (1.145 mm or 4.5 mils), thereby increasing the web thickness to 0.75 mm (30 mils), may increase the relative humidity of the air flowing in the air flow channel 61 to about 57% with the same permeability.

Typically, the coolant is under vacuum. If the air becomes so wet that there is condensation, the liquid water should get sucked into the coolant stream.

To keep the pressure low, the shallow portion 63 of the air flow channels should be no longer than necessary. The wetting of the incoming air is enhanced by having the closest water channel 52 as near as possible to the inlet edge 55 of the water transport plate 50, subject to other considerations.

The invention claimed is:

1. A proton exchange membrane fuel cell having a planform, comprising:
    an active area smaller than said planform;
    a conductive water permeable plate coextensive with said planform and having (a) a plurality of reactant gas flow field channels extending inwardly from a first surface of said plate, said reactant gas flow field channels having reactant gas inlets at an edge of said plate, and (b) a plurality of water channels extending inwardly from a second surface of said plate opposite to said first surface, characterized by:
    the depth of portions of said reactant gas flow field channels between said active area and said inlets being less than the depth of the remaining length of said reactant gas flow field channels.

2. A fuel cell according to claim 1 further characterized in that:
    the portion of said reactant gas flow field channels upstream of said active area are between 30% and 50% less deep than the depth of the remaining length of said flow field channels.

3. A fuel cell according to claim 1 further characterized in that:
    the portions of said reactant gas flow field channels upstream of said active area are between 25% and 50% of the thickness of said reactant gas flow field plate.

4. A fuel cell according to claim 1 further characterized in that:
    the inlets are air inlets and the portion of the reactant gas flow field channels upstream of said active area are sufficiently shallow so as to increase the relative humidity of air flow entering said active area by between 15% and 25%, compared with the relative humidity of air flow entering said active area from reactant gas flow field channels having portions upstream of said active area substantially the same depth as the depth of the remaining lengths of said reactant gas flow field channels, when air flow is maximum.

5. A fuel cell power plant characterized by a stack of fuel cells according to claim 1.

6. A method of improving humidification of reactant gas as it enters an active area of a proton exchange membrane fuel cell having reactant gas flow field plates which are conductive and water permeable, characterized by:
    configuring the depth of reactant gas flow field channels in said reactant gas flow field plates, between the active area and inlets of the reactant gas flow field channels, to be more shallow than the depth of the remaining lengths of said flow field channels.

7. A method according to claim 6 further characterized in that:
    configuring the portion of said reactant gas flow field channels upstream of said active area to be between 30% and 50% less deep than the depth of the remaining length of said reactant gas flow field channels.

8. A method according to claim 6 further characterized in that:
    configuring the portions of said reactant gas flow field channels upstream of said active area to be between 25% and 50% of the thickness of said reactant gas flow field plate.

9. A method according to claim 6 further characterized in that:
    the inlets are air inlets and said configuring comprises configuring the portion of the reactant gas flow field channels between said active area and said inlets to be sufficiently shallow so as to increase the relative humidity of air entering said active area by between 15% and 25% compared with relative humidity of air entering channels having the portions upstream of said active area the same depth as the depth of the remaining lengths of said flow field channels.

10. A method according to claim 6 further characterized in that:
    the inlets are air inlets and said configuring comprises configuring the portion of the reactant gas flow field channels between said active area and said inlets to be sufficiently shallow so as to provide relative humidity if air entering said active area to be at least 55% when air flow is maximum.

* * * * *